United States Patent
Shiu et al.

(10) Patent No.: US 8,652,708 B2
(45) Date of Patent: Feb. 18, 2014

(54) FLUID FLOW PLATE WITH A SUPPORTING FRAME FOR A FUEL CELL

(75) Inventors: Huan-Ruei Shiu, Penghu County (TW); Chi-Chang Chen, Changhua County (TW); Shiqah-Ping Jung, Taoyuan County (TW); Wen-Chen Chang, Hsinchu County (TW); Fanghei Tsau, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 463 days.

(21) Appl. No.: 12/770,624

(22) Filed: Apr. 29, 2010

(65) Prior Publication Data

US 2011/0177429 A1   Jul. 21, 2011

(30) Foreign Application Priority Data

Jan. 21, 2010   (TW) .............................. 99101592 A (51) Int. Cl.
 *H01M 8/02*   (2006.01)
(52) U.S. Cl.
 USPC ........... 429/514; 429/456; 429/457; 429/512; 429/513
(58) Field of Classification Search
 USPC ........................................................ 429/460
 See application file for complete search history.

(56) References Cited

U.S. PATENT DOCUMENTS

| | | | |
|---|---|---|---|
| 5,464,700 A | 11/1995 | Steck et al. | |
| 5,514,487 A | 5/1996 | Washington et al. | |
| 5,750,281 A | 5/1998 | Washington et al. | |
| 6,017,648 A | 1/2000 | Jones | |
| 6,232,008 B1 | 5/2001 | Wozniczka et al. | |
| 6,274,262 B1 | 8/2001 | Canfield | |
| 6,383,347 B1 | 5/2002 | Stuart et al. | |
| 6,410,179 B1 | 6/2002 | Boyer et al. | |
| 6,472,093 B2 | 10/2002 | Faris et al. | |
| 6,500,580 B1 | 12/2002 | Marvin et al. | |
| 6,607,858 B2 | 8/2003 | Wozniczka et al. | |
| 6,610,435 B1 | 8/2003 | Maruyama et al. | |
| 7,494,737 B2 | 2/2009 | Arisaka et al. | |
| 2005/0130009 A1 | 6/2005 | Hasegawa et al. | |
| 2005/0233190 A1 | 10/2005 | Finkelshtain et al. | |
| 2005/0260481 A1 | 11/2005 | Finkelshtain et al. | |
| 2007/0134541 A1* | 6/2007 | Arisaka et al. .................. | 429/38 |

FOREIGN PATENT DOCUMENTS

| | | |
|---|---|---|
| DE | 10210293 A1 | 10/2003 |
| JP | 06-089728 * | 3/1994 |
| JP | 2001-006695 | 1/2001 |
| JP | 2001-266910 | 9/2001 |

(Continued)

OTHER PUBLICATIONS

Office Action in German Patent Application No. 10 2010 020 159.6-45, German Patent and Trademark Office, Aug. 3, 2010.

(Continued)

*Primary Examiner* — Ula C Ruddock
*Assistant Examiner* — Tony Chuo (57) ABSTRACT

A fluid flow plate of a fuel cell includes a main body and a supporting frame. The main body includes a plurality of fluid channels and an opening, wherein the fluid channels converge at the opening. The supporting frame, mounted on the periphery of the opening, is annular shaped and frames the fluid channels. The supporting frame includes a pair of supporting walls respectively disposed on two sides of the fluid channels.

7 Claims, 8 Drawing Sheets

(56) References Cited

FOREIGN PATENT DOCUMENTS

| | | |
|---|---|---|
| JP | 2004-171887 | 6/2004 |
| JP | 2004-342342 | 12/2004 |
| JP | 2004-349014 | 12/2004 |
| JP | 2005-228595 | 8/2005 |
| TW | 1235518 | 7/2005 |
| TW | M292791 | 6/2006 |
| TW | M304780 | 1/2007 |
| TW | 1282185 | 6/2007 |
| TW | 200812140 A | 3/2008 |
| WO | WO 98/47197 | 10/1998 |
| WO | WO 99/18628 | 4/1999 |

OTHER PUBLICATIONS

Taiwan Patent Office Office Action, Patent Application serial No. 099101592, Jul. 18, 2012, Taiwan.

Japan Patent Office, Office Action, Patent Application Serial No. 2010-189094, Dec. 4, 2012, Japan.

* cited by examiner

FLUID FLOW PLATE WITH A SUPPORTING FRAME FOR A FUEL CELL

CROSS REFERENCE TO RELATED APPLICATIONS

This Application claims priority of Taiwan Patent Application No. 099101592, filed on Jan. 21, 2010, the entirety of which is incorporated by reference herein.

BACKGROUND OF THE INVENTION

1. Field of the Invention

The invention relates to a fluid flow plate, and in particular, to a fluid flow plate utilized in a fuel cell.

2. Description of the Related Art

Figure 1:
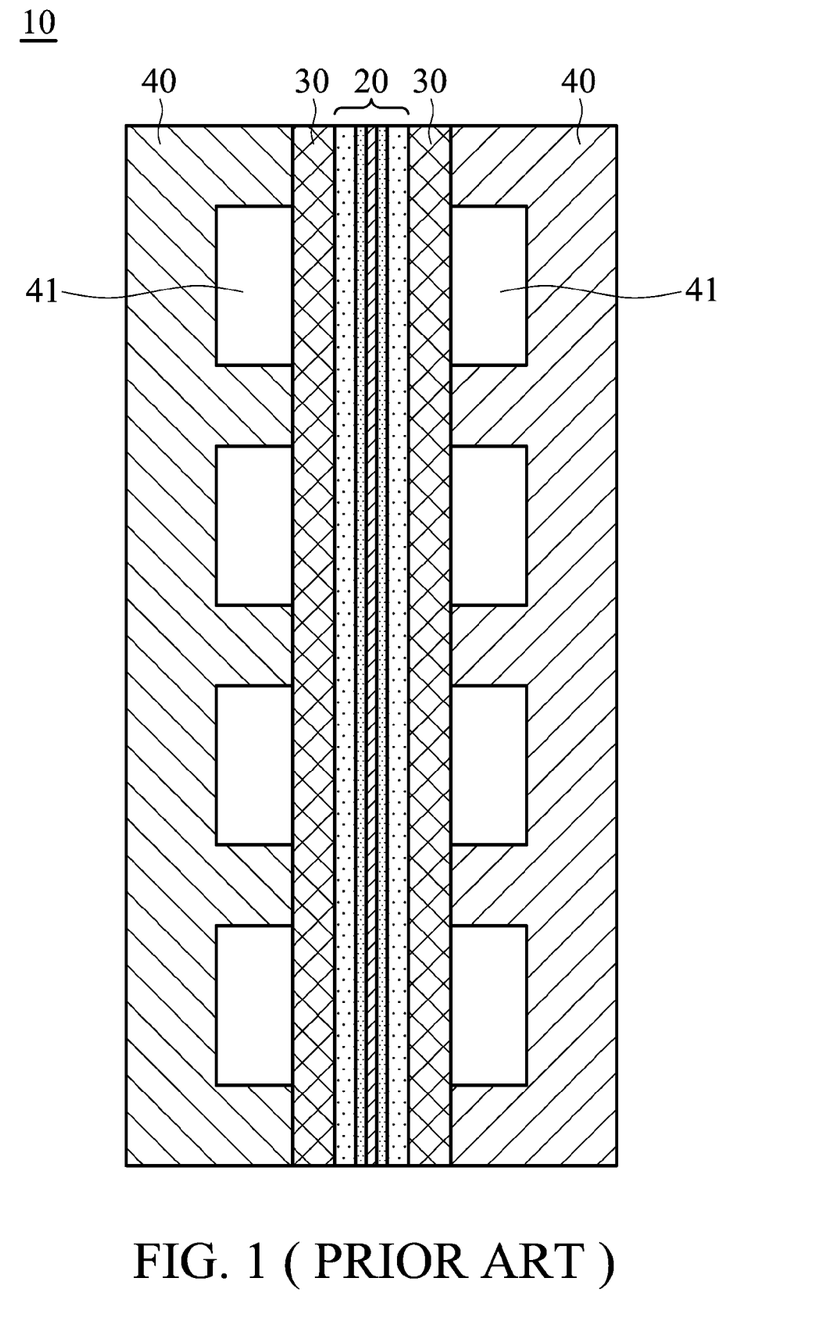
FIG. 1 is a schematic view of a conventional fuel cell.

A fuel cell stack is layered by multiple fuel cells. As shown in FIG. 1, each fuel cell 10 comprises a membrane electrode assembly (MEA) 20, two layers of gas diffusion layers (GDL) 30 and two flow fluid plates 40. The GDLs 30 are on two sides of the MEA 20, and each of which is sandwiched between the MEA 20 and one of the flow fluid plates 40. The flow fluid plate 40 comprises a plurality of fluid channels 41 to transmit and distribute the flow fluid within the fuel cell 10.

Operating stability and the reliability of the fuel cell 10 is dependent upon the efficiency of fluid flowing into the fluid channels 41 of each fluid flow plate 40 for electrochemical reactions and therefrom.

When the fuel cells 10 are stacked into a fuel cell stack, however, due to the assembly process, force may be applied to the fuel cells 10, wherein the fluid channels 41 near the inlet and the outlet of each fluid flow plate 40 may become deformed or collapse. In such a case, the MEA 20 and the GDLs 30 would be separated and the flow process of the fluid would be hindered.

BRIEF SUMMARY OF THE INVENTION

Accordingly, a fluid flow plate of a fuel cell is provided. The fluid flow plate includes a main body and a supporting frame. The main body includes a plurality of fluid channels and an opening, wherein the fluid channels converge at the opening. The supporting frame, mounted on the periphery of the opening, is annular shaped and frames the fluid channels. The supporting frame includes a pair of supporting walls respectively disposed on two sides of the fluid channels.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 2:
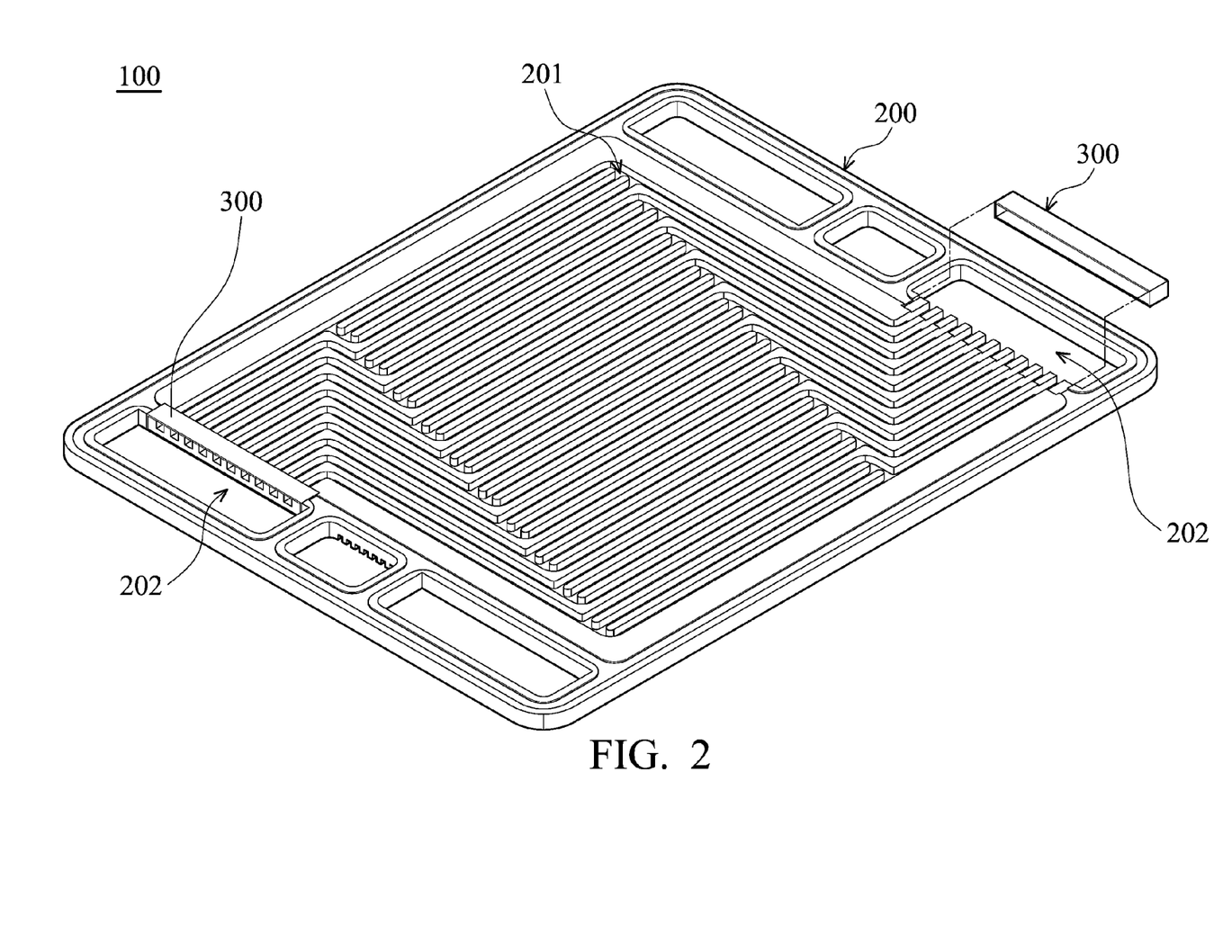
FIG. 2 is schematic view of a fluid flow plate of the invention.

Referring to FIG. 2, the fluid flow plate 100 of a fuel cell of the invention comprises a main body 200 and a supporting frame 300. The main body comprises a plurality of fluid channels 201 and a plurality of openings 202. The openings 202 are formed at the inlet and the outlet of the converged areas of the fluid channels 201, and the supporting frame 300 is disposed on the periphery of the opening 202 and frames the fluid channels 201.

Figure 3A:
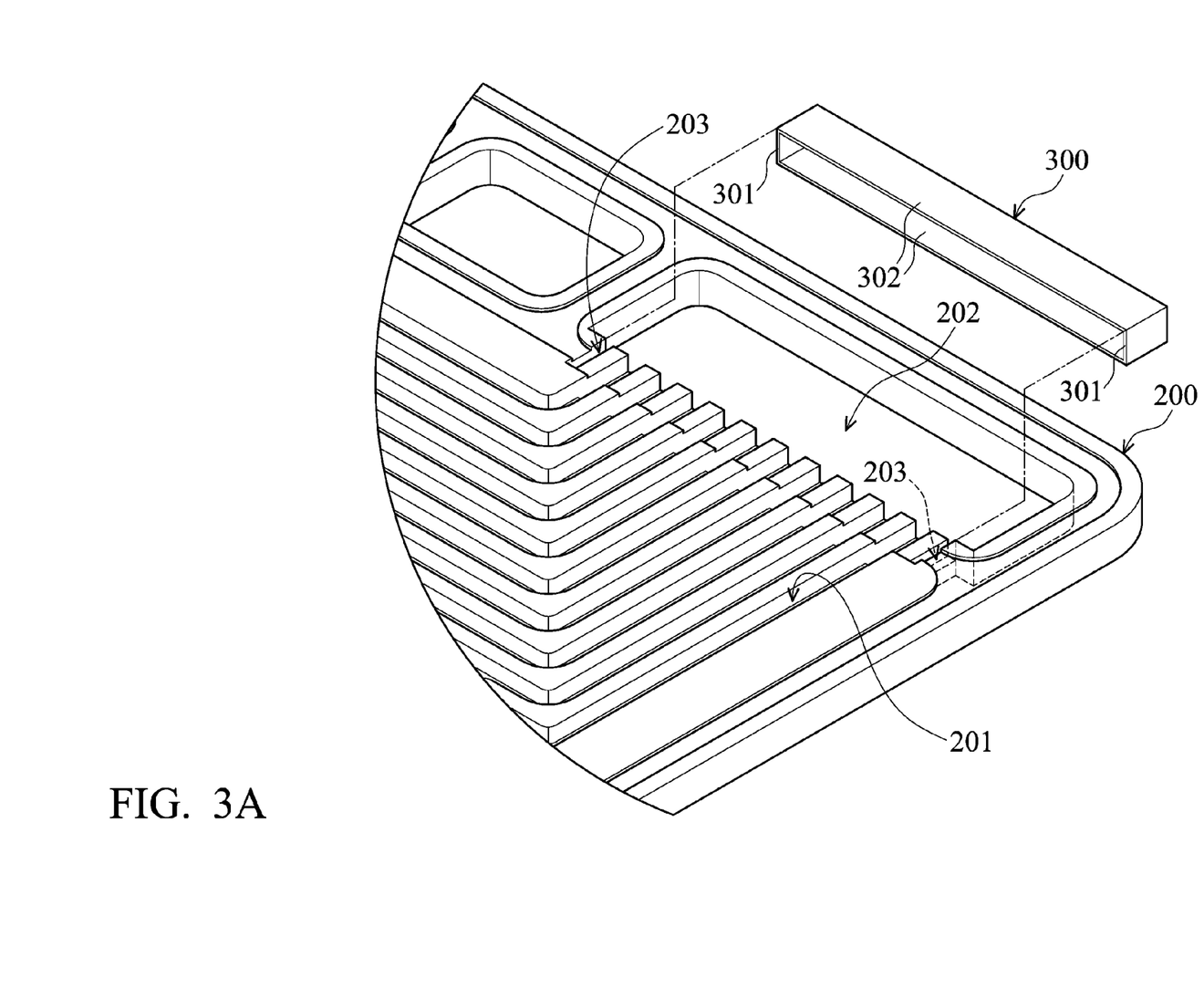
FIGS. 3A and 3B are schematic views of the fluid flow plate of the invention viewed from different view points.
Figure 3B:
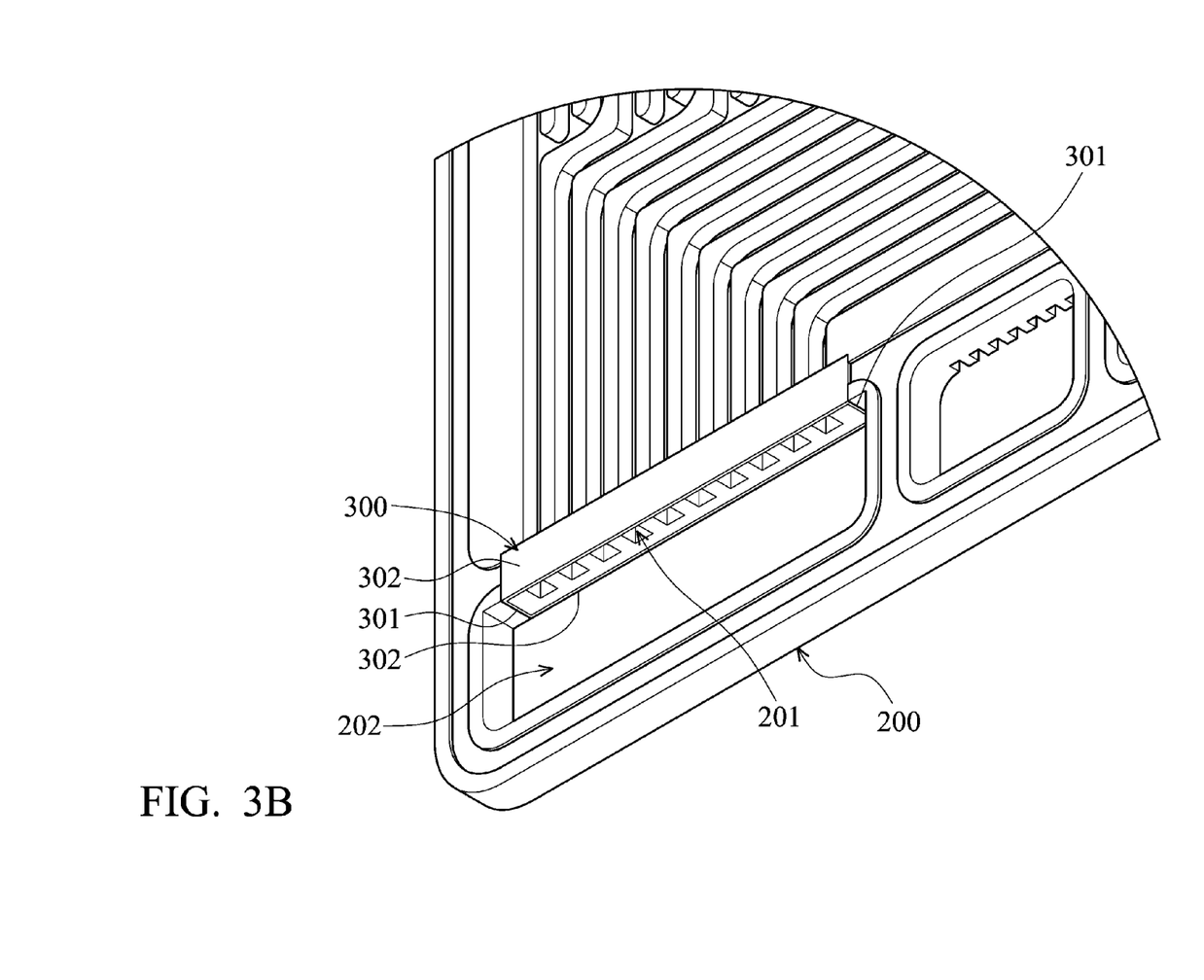

In detail, referring to FIGS. 3A and 3B, the supporting frame 300 is annular shaped and comprises a pair of first supporting walls 301 and a pair of second supporting walls 302. The first supporting walls 301 are opposite to each other, and the second supporting walls 302 are also opposite to each other. The first supporting walls 301 and the second supporting walls 302 alternatively connect with each other to form the annular shape (as shown in FIG. 3A). The main body 200 comprises two engaging notches 203 extending from the opening 202 into the main body 200. By engaging the first supporting walls 301 with the engaging notches 203, the supporting frame 300 may frame the fluid channels 201 (as shown in FIG. 3B) and the fluid channels 201 may extend into the supporting frame 300. Moreover, an inner surface and an outer surface of each first supporting walls 301 both abut the main body 200, enabling the supporting frame 300 to tightly attach to the main body 200. The second supporting walls 302 are flush with the main body 200.

Figure 4A:
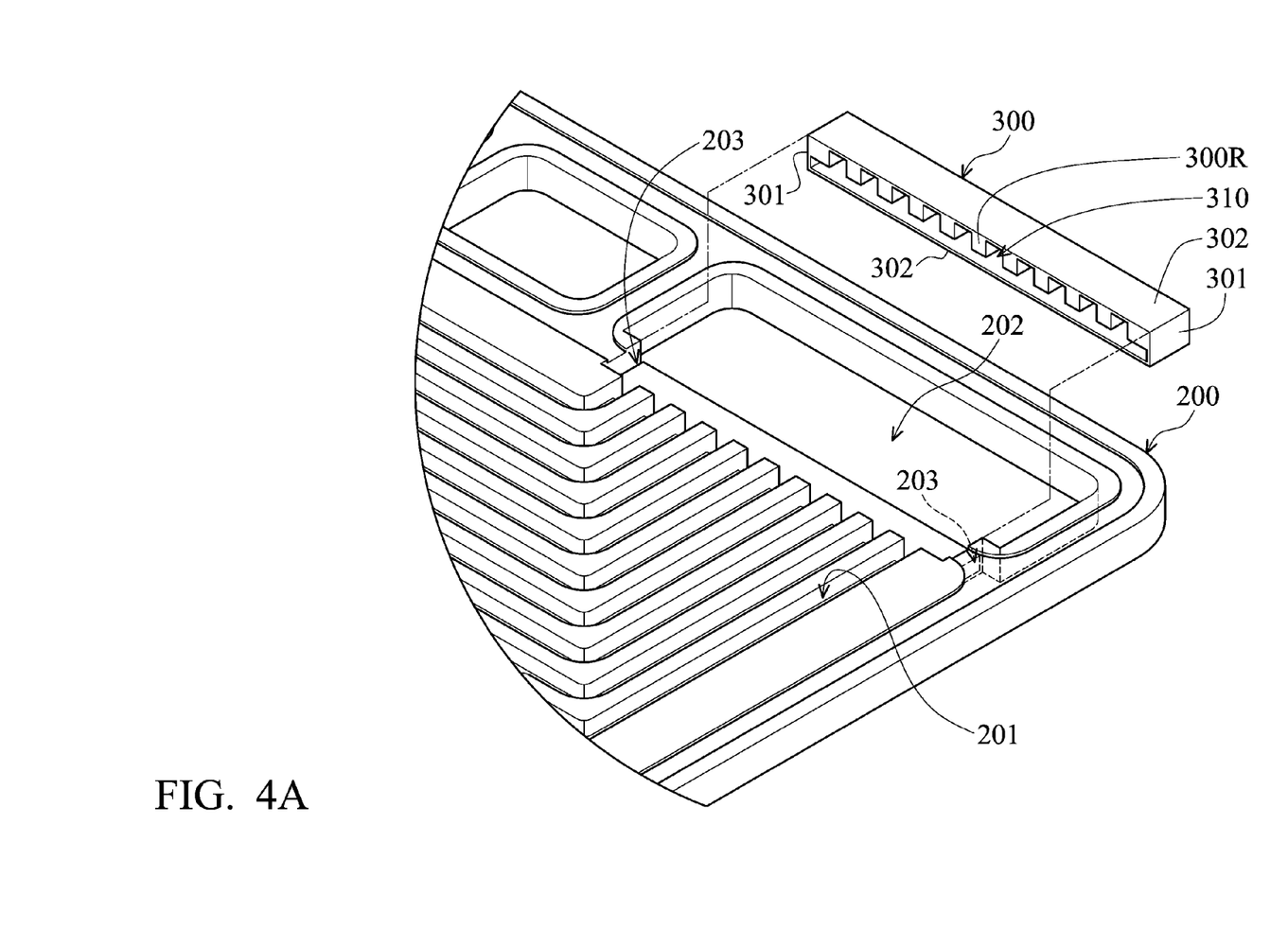
FIGS. 4A and 4B are schematic views of a variant embodiment of the fluid flow plate of the invention viewed from different view points.
Figure 4B:
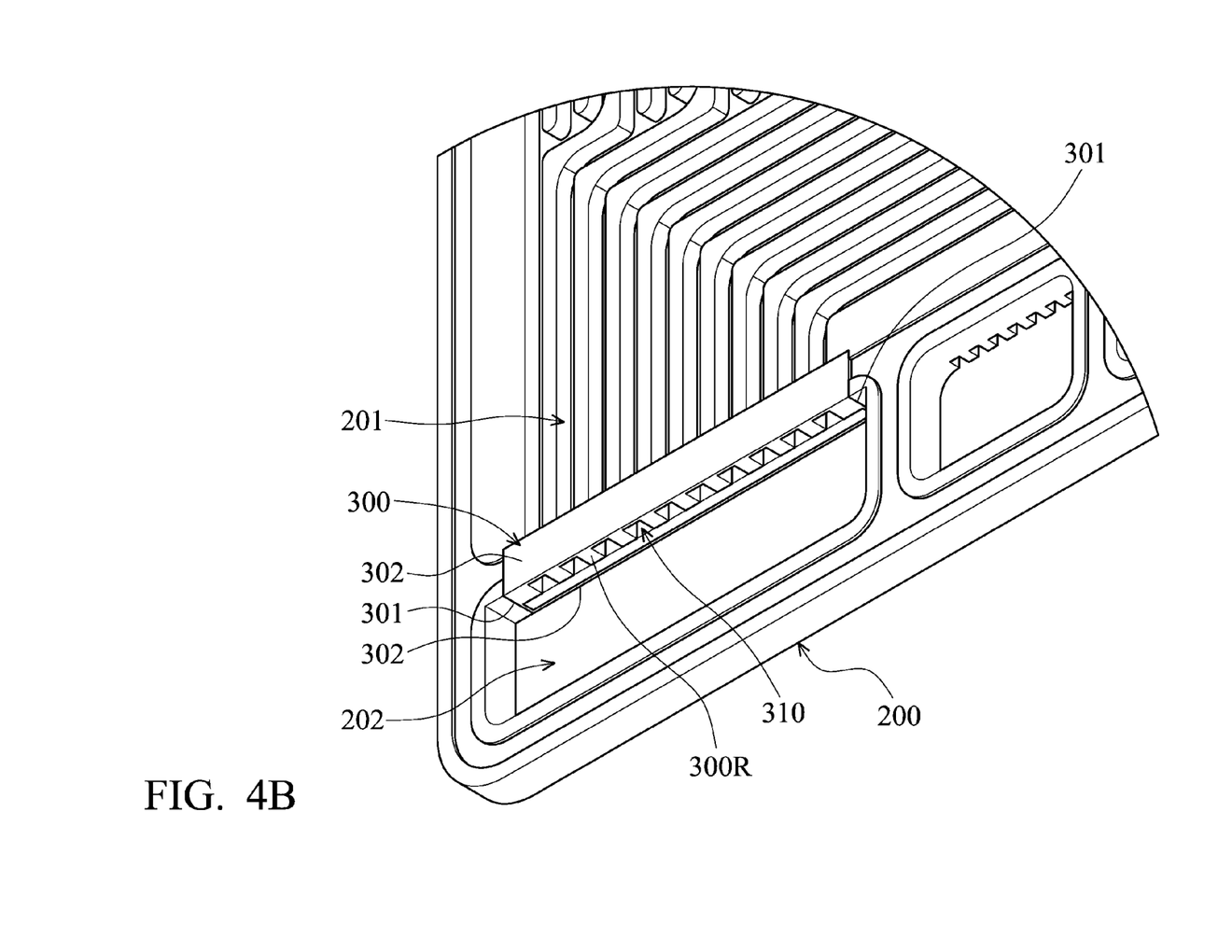

Referring to FIGS. 4A and 4B, in a variant embodiment, the supporting frame 300 comprises a plurality of ribs 300R disposed on an inner surface of the second supporting walls 302. A plurality of corresponding channels 310 are formed between every two adjacent ribs 300B corresponding to the fluid channels 201 of the main body 200. When the supporting frame 300 engages with the engaging notches 203, the fluid channels 201 connect with the corresponding channels 310.

Figure 5A:
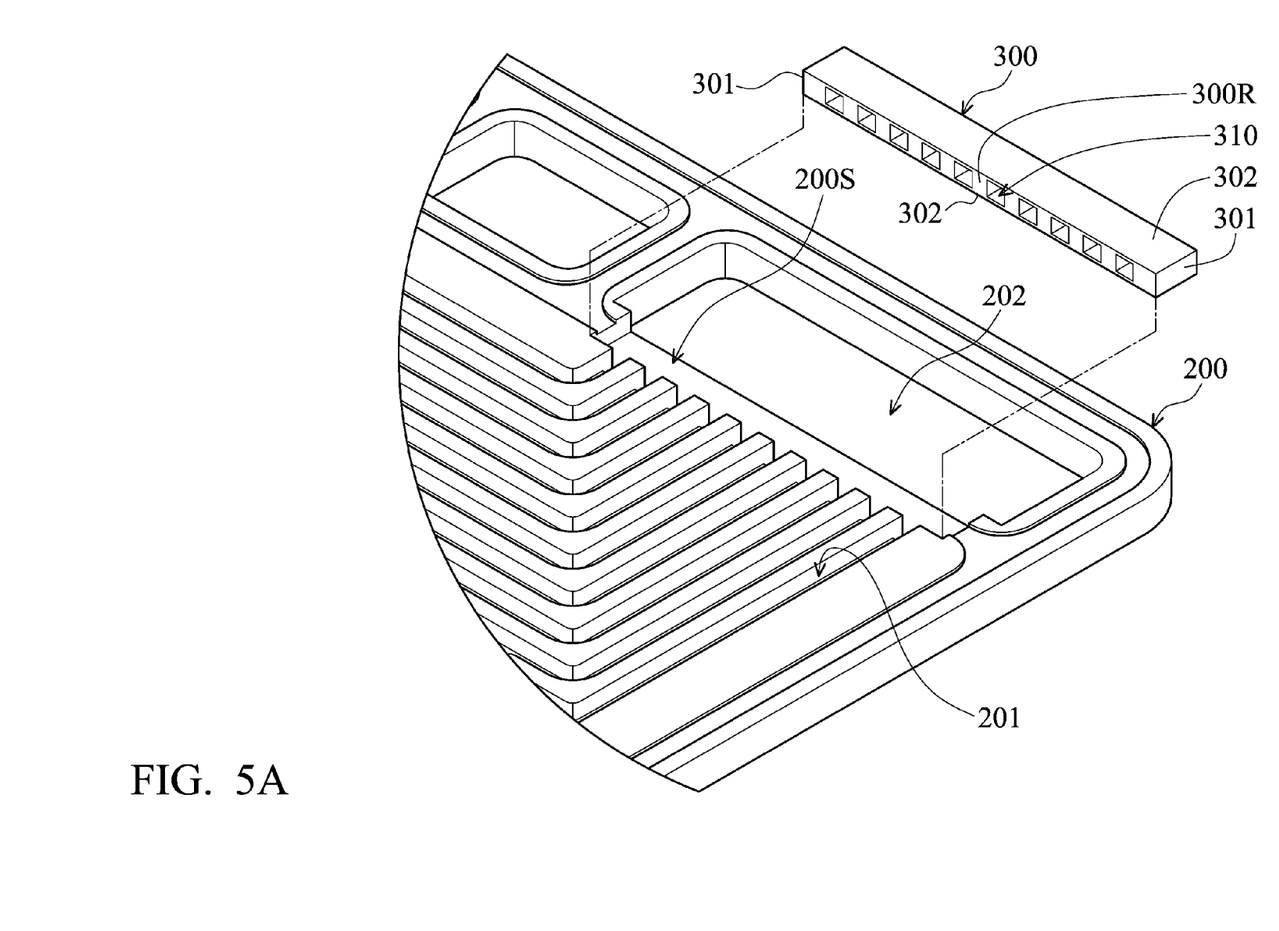
FIGS. 5A and 5B are schematic views of another variant embodiment of the fluid flow plate of the invention viewed from different view points.
Figure 5B:
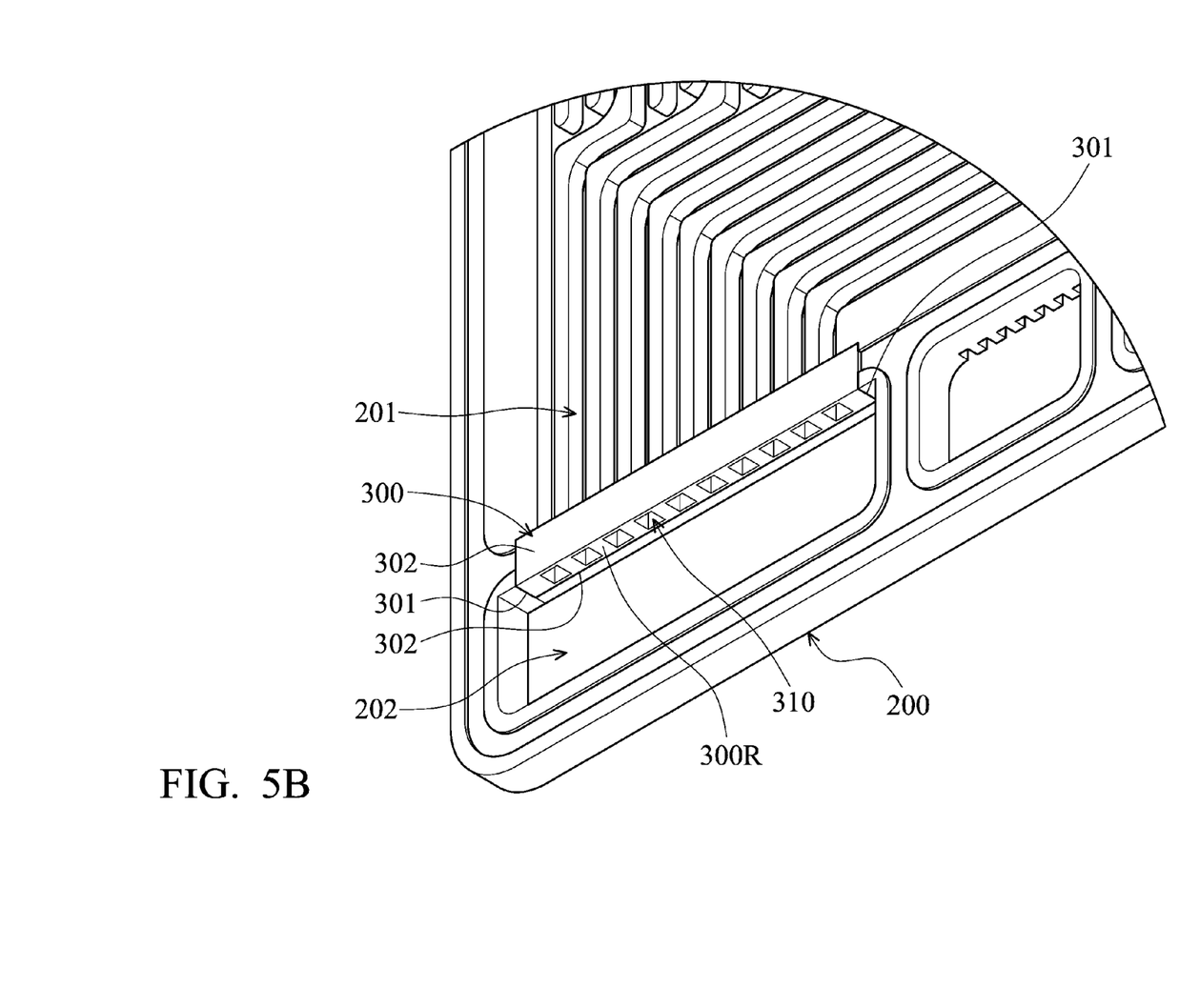

Referring to FIGS. 5A and 5B, in another variant embodiment, the main body 200 comprises an accommodating space 200S formed on the periphery of the opening 202 and corresponding to the fluid channels 201. Thus, the engaging notches 203 originally formed on the main body 200 can be eliminated. The supporting frame 300 is tightly fit into the accommodating space 200S. By the abutment between the first supporting walls 301 and the main body 200, the supporting frame 300 can be tightly disposed on the main body 200, and the second supporting walls 302 can be flush with the main body 200.

In all of the above embodiments, the supporting frame 300 is annular shaped, and the first supporting walls 301 is tightly attached to the main body 200 when the supporting frame 300 is assembled to the main body 200. Additionally, the extended direction of the first supporting walls 301 is parallel with the stacked direction of the fuel cells in a fuel cell stack, enabling assembly force during assembly to be transferred directly through the first supporting walls 301 within every fuel cell. Therefore, deformation of the supporting frame 300 and collapse of the fluid channels 201 are prevented.

The fluid flow plate 100 of the invention utilizes the supporting frame 300 and disposes the supporting frame 300 at the inlet and the outlet of the fluid channels 201 to enhance structural integrity and strength. When multiple fuel cells are stacked together, the fluid flow plate 100 within each of the fuel cells supports the inlet and the outlet areas of the fluid channels 201, avoiding separation of the MEA and the GDLs. As a result, fluid therein can smoothly flow through the inlet and the outlet of the fluid channels 201 and be uniformly distributed among the stacked fuel cells to ensure operating stability and the reliability of the fuel cell stack.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A fluid flow plate of a fuel cell, comprising:
a main body comprising a plurality of fluid channels and an opening, wherein the fluid channels converge at the opening; and
a supporting frame, mounted on the periphery of the opening, wherein the supporting frame, rectangular shaped and framing the fluid channels, comprises a pair of first supporting walls respectively disposed on two sides of the fluid channels, a pair of second supporting walls alternately connected to the first supporting walls and flushed with the main body, and the rectangular supporting frame is formed by the first and second supporting walls;
wherein the main body comprises two engaging notches, extending from the opening into the main body and engaging the supporting frame via the first supporting walls such that the fluid channels extend into the supporting frame and are surrounded by the pair of first supporting walls and the pair of second supporting walls.

2. The fluid flow plate of a fuel cell as claimed in claim 1, wherein the opening is formed at an inlet or an outlet of a converged area of the fluid channels.

3. The fluid flow plate of a fuel cell as claimed in claim 1, wherein an inner surface and an outer surface of each of the first supporting walls abut the main body.

4. The fluid flow plate of a fuel cell as claimed in claim 1, wherein the supporting frame comprises a plurality of ribs disposed on the second supporting wall, and a plurality of corresponding channels, formed between every two adjacent ribs, connecting with the fluid channels.

5. The fluid flow plate of a fuel cell as claimed in claim 1, wherein the supporting frame comprises a plurality of corresponding channels connecting with the fluid channels.

6. The fluid flow plate of a fuel cell as claimed in claim 1, wherein the fluid channels extend into the supporting frame.

7. The fluid flow plate of a fuel cell as claimed in claim 1, wherein the main body comprises an accommodating space formed on the periphery of the opening and corresponding to the fluid channels to receive the supporting frame.

* * * * *